Patented May 28, 1935

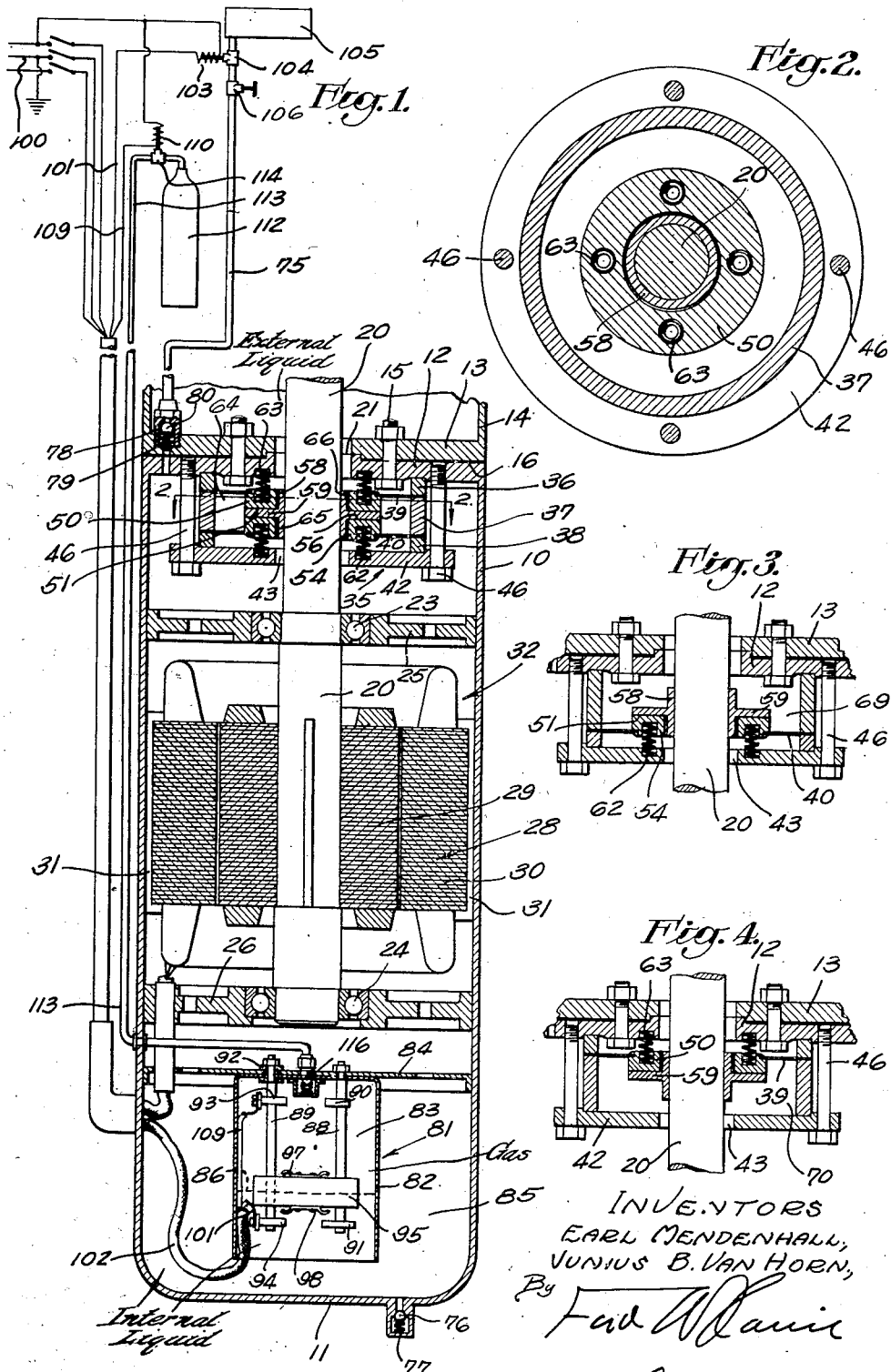

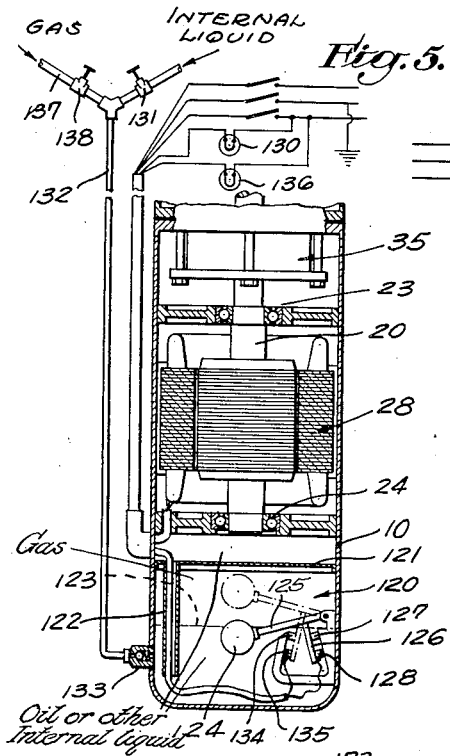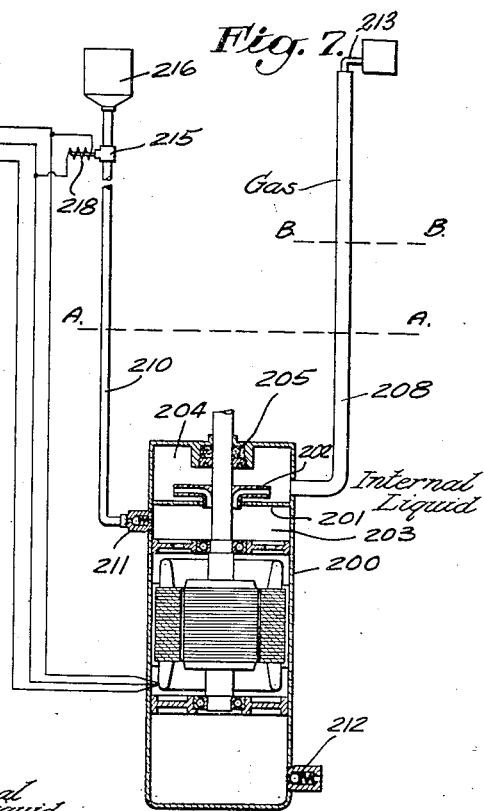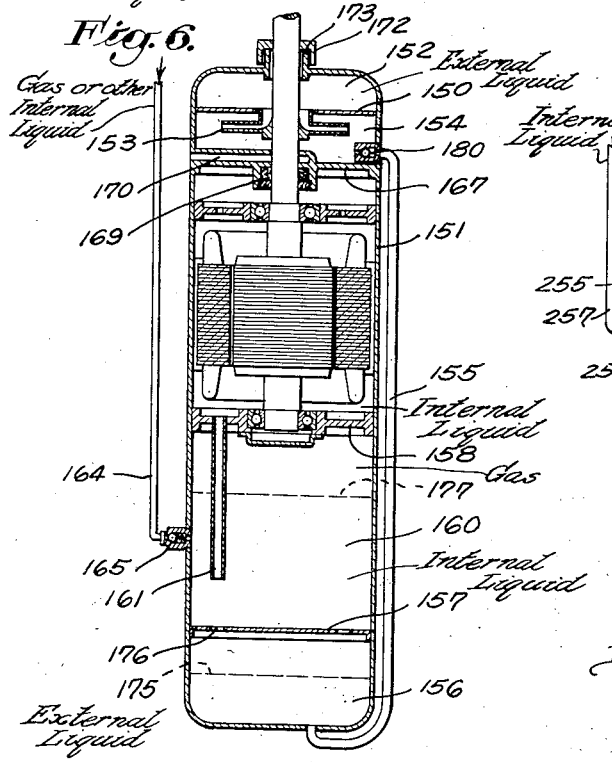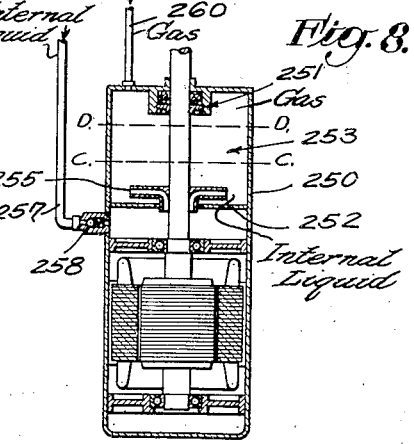

2,002,913

UNITED STATES PATENT OFFICE 2,002,913

SUBMERSIBLE MOTOR STRUCTURE WITH MECHANICAL SEAL

Earl Mendenhall and Junius B. Van Horn, Los Angeles, Calif., assignors to Menhorn, Inc., Los Angeles, Calif., a corporation of California Application September 26, 1932, Serial No. 634,909

34 Claims. (Cl. 172—36)

Our invention relates to a submersible structure, and more particularly to a novel form of submersible motor.

It is often desirable to position a motor or bearing beneath the surface of a liquid which might be injurious thereto should it come in contact therewith. In accomplishing this result it is necessary to enclose the motor or other unit in a suitable fluid-tight shell. It is usually necessary to provide a rotatable shaft extending from this shell and difficulty is often encountered in providing a suitable seal at the junction of the shaft and the shell.

In certain installations it is desirable to maintain a pressure inside the shell which is greater than the pressure outside thereof, and it is an object of the present invention to provide such a structure. Such a combination finds particular utility in conjunction with a sectional shell in which there is a possibility of leakage at the junction of these sections. So also, the provision of an excess internal pressure finds utility with certain types of sealing devices wherein it is desired to maintain an outward flow through the sealing device to prevent ingress of any of the external liquid in which the structure is submerged.

The preferred embodiment of the present invention comprehends the use of such a structure in which a continuous outward flow through the sealing means takes place due to a pressure differential on opposite sides of the seal.

Many features of the invention find utility, however, regardless of whether or not this type of seal is utilized, and the invention includes among these features a novel pressure regulating system for maintaining the desired pressure in the shell. In the preferred embodiment this system includes a gas chamber communicating at its lower end with the internal liquid inside the shell, this structure forming another of the objects of the invention. The gas in the upper end of this chamber may be entrapped therein or may be permitted to move into and from this chamber, both systems falling within the scope of the invention.

The invention further comprehends a novel device for controlling the supply of the fluid to such a gas chamber, whether this fluid be the liquid in the shell or the gas or both.

In the event that an electric motor is positioned inside the structure it will often be found desirable to substantially fill the shell with an internal liquid which is not injurious to the motor. When, however, the motor is energized there is a tendency for this liquid to heat and expand, and it is one of the objects of the present invention to provide a system which compensates for such expansion.

Further objects of the invention lie in the novel positioning of the gas chamber, as well as in the utilization of one or more check valves which cooperate with the pressure control system in a novel manner.

Still further objects of the invention lie in the provision of a novel type of seal, usually of the metal-to-metal type, permitting an outward flow therethrough, one form of this seal including a dual-element sealing structure of novel construction.

Further objects and advantages of the invention will be made evident hereinafter.

Several forms of the invention are shown diagrammatically in the accompanying drawings, in which—

Fig. 1 is a vertical sectional view of one form of the invention.

Fig. 2 is a sectional view taken on the line 2—2 of Fig. 1.

Figs. 3 and 4 represent alternative forms of the sealing device utilized in Fig. 1.

Figs. 5, 6, 7, and 8 represent modifications of the invention.

Referring particularly to Fig. 1, we have illustrated a shell 10 closed at its lower end by a lower wall 11 and at its upper end by an upper wall 12. A base 13 of an auxiliary shell 14 may be secured to the upper wall 12 as by bolts 15, a packing 16 being interposed therebetween.

The base 13 and upper wall 12 provide aligned openings through which a shaft 20 extends, these openings being of larger diameter than the shaft so as to provide an annular passage 21. This shaft is journalled in the shell 10 by bearings 23 and 24 respectively retained in intermediate walls 25 and 26 suitably perforated to permit intercommunication between all portions of the interior of the shell. In the form of the invention shown in Fig. 1 an electric motor 28 is positioned in the shell 10, a rotor 29 thereof being secured to the shaft 20 and the stator 30 thereof being suitably mounted in the shell 10. At least a portion of the periphery of the stator 30 is spaced from the shell 10 to provide passages 31 communicating between opposite ends of a motor chamber 32 in which the motor is positioned.

A novel sealing device is positioned at the junction of the shaft and the upper wall 12.

This sealing device is indicated in general by the numeral 35 and includes upper intermediate and lower ring members 36, 37, and 38. The periphery of an upper diaphragm or retaining member 39 is positioned between the ring members 36 and 37 while the periphery of a similar lower retaining member or diaphragm 40 is positioned between the ring members 37 and 38. A plate 42 is spaced from the shaft 20 by an annular space 43 and contacts the lower ring member 38 as shown. A plurality of studs 46 extend upward through this plate 42 and are threaded into the upper wall 12 to clamp the ring members 36, 37, and 38 and the diaphragms 39 and 40 between the upper wall 12 and the plate 42 to form a fluid-tight junction between these elements.

An upper sealing ring 50 is welded or otherwise secured to the inner end of the upper diaphragm 39 and provides a sealing surface 51 which is preferably, though not necessarily, positioned in a plane at right angles to the axis of the shaft 20. Similarly, a lower sealing ring 54 is secured in fluid-tight relationship with the inner portion of the lower diaphragm 40 and provides a sealing surface 56 which may also extend in a plane at right angles to the axis of rotation of the shaft 20.

Retained on the shaft 20 or integrally formed therewith is a collar member 58 including a shoulder 59 extending between the sealing rings 50 and 54. This collar provides upper and lower sealing surfaces in surface contact with the sealing surfaces 51 and 56. The sealing surfaces of the shoulder 59 and the sealing rings 50 and 54 are retained in pressural contact with each other by any suitable means. In Fig. 1 we have illustrated this means as comprising a plurality of springs 62 extending into corresponding depressions of the sealing ring 54 and the plate 42 to hold this sealing ring in resilient engagement with the shoulder 59. Similarly, this means is shown as including a plurality of springs 63 extending into corresponding depressions of the upper wall 12 and the sealing ring 50 to resiliently force this sealing ring into engagement with the shoulder 59. It will be understood that the diaphragms 39 and 40 are sufficiently flexible to permit the springs 62 and 63 as well as the differential pressure on opposite sides of these diaphragms to maintain the resilient engagement, and compensate for any wear of the sealing surfaces.

In this form of the invention, the motor chamber is filled with a liquid which is not injurious to the motor, this liquid being hereinafter termed an internal liquid as distinguished from the external liquid outside the shell and in which the shell 10 is submerged. If the pressure on the internal liquid is greater than the pressure on the external liquid, there will be a tendency for the internal liquid to leak through the seal 35. This leakage will take place upward through the annular space 43 and through an intake space 65 immediately inside the sealing ring 54. Thereafter a minute amount of this internal liquid will be forced outward between the sealing surfaces of the shoulder 59 and the sealing ring 54 and will escape into an intermediate chamber 64. This amount of leakage will be quite minute, but will be sufficient to form a film slightly separating the sealing surfaces of the lower sealing ring 54 and the shoulder 59 to prevent undue friction therebetween which would prematurely wear these surfaces.

This maintenance of the film of the internal liquid is an important factor in the life of this type of seal, and it is essential that a sufficient pressure differential be developed to maintain this film. On the other hand, it will be clear that this differential pressure acting on the diaphragm 40 will tend to move the sealing ring 54 toward the shoulder 59 thus tending to decrease the flow therebetween. The springs 62 and 63 are thus designed to act in conjunction with this differential pressure to secure the proper leakage between the sealing surfaces.

The intermediate chamber 64 is sealed with respect to the motor chamber 32 by the diaphragms 39 and 40 and the intermediate ring member 37. Any leakage which takes place into this chamber must thus escape between the sealing surfaces of the sealing ring 50 and the shoulder 59, moving inward toward the axis of the shaft and being discharged upward into a discharge space 66 immediately inside the upper sealing ring 50. Thereafter this leakage moves through the annular space 21. This minute flow in an inward direction maintains a film of the internal liquid separating the sealing surfaces of the sealing ring 50 and the shoulder 59 thereby preventing excessive wear.

Our experiments indicate that there is a definite tendency for the internal and external liquids to emulsify between the sealing surfaces in the absence of a sufficient pressure differential to maintain an outward flow. Thus, if the pressures on opposite sides of this seal were equal there would be a tendency for a portion of the external liquid to move into the intermediate chamber 64 between the sealing ring 50 and the shoulder 59. Likewise, there will be a tendency for the internal liquid in the intermediate chamber 64 to move radially inward between these same elements and thus escape into the external liquid. The latter tendency is not detrimental but any tendency for the external liquid to enter the intermediate chamber 64 must be counteracted, otherwise the liquid in this intermediate chamber will be contaminated and a portion of this contaminated liquid will move inward between the ring 54 and the shoulder 59 to reach the motor. This tendency can be counteracted by maintaing a sufficient pressure differential to insure that a small portion of the internal liquid will continuously move through the seal and be discharged through the annular passage 21, the pressure differential being sufficient to prevent any movement of the external liquid into the intermediate chamber 64.

It should not be understood that we are limited to the type of seal indicated by the numeral 35. In other instances it is possible to utilize a conventional stuffing box or other well-known type of sealing means. In other instances it is possible to modify the type of seal indicated by the numeral 35. Thus, in Fig. 3 we have illustrated a seal in which the upper sealing ring 50, the upper diaphragm 39, and the upper springs 63 are eliminated, leaving only the lower sealing ring 54 and the shoulder 59 to effect a sealing action. In this form of the invention the ring members 36 and 37 are formed integrally so that a chamber 69 is formed above the diaphragm 40 and into which the internal liquid is forced as it moves between the sealing surfaces of the ring 54 and the shoulder 59. As previously pointed out, our experiments indicate that there is a tendency for the external liquid to move inward between the sealing surfaces and a tendency for the internal liquid to move outward between these sealing surfaces. The inevitable result is that an intermixture is formed between these sealing surfaces unless the pressure differential is maintained sufficiently high to prevent any of the external liquid moving inward between these faces. In the form of seal shown in Fig. 3 any intermixture which is formed will tend to be moved outward from the space between the sealing surfaces due to the centrifugal action thereon. Such an intermixture will thus move away from the motor chamber, a desirable condition.

In Fig. 4 we have illustrated a seal in which the lower sealing ring 54, the lower diaphragm 40, and the spring 62 are dispensed with, this type of seal utilizing only the sealing surfaces defined by the upper ring 50 and the shoulder 59. In this form of seal a chamber 70 formed below the upper diaphragm 39 is in communication with the internal liquid through the annular space 43. This type of seal is usually not as desirable as the type shown in Fig. 3 in view of the fact that any intermixture which might be formed between the sealing surfaces tends to be thrown outward and into the chamber 70, and thus eventually reach the windings of the motor. In the form of the invention shown in Fig. 3, the centrifugal action on such an intermixture tends to assist in keeping external liquid from the motor, but in the form of the invention shown in Fig. 4 this is not true. However, if a sufficient pressure differential is utilized, it is possible to utilize the type of seal shown in Fig. 4.

The amount of pressure differential which it is necessary to maintain in order to prevent ingress of the external liquid will depend upon the size of the seal, the type of materials utilized in forming the sealing surfaces and the pressure exerted by the springs. This pressure differential must ordinarily be several pounds per square inch or more. In the form of seal shown in Fig. 3 it is sometimes possible to utilize a lower pressure differential than with the form shown in Figs. 1 and 4 due to the fact that the centrifugal action between the sealing surfaces tends to assist in moving internal liquid from the shell. With the form of the invention shown in Fig. 1, however, it will be clear that inasmuch as the intermediate chamber 64 is closed, any centrifugal action between the sealing ring 54 and the shoulder 59 will be opposed by an equivalent centrifugal action between the sealing ring 50 and the shoulder 59, both of these centrifugal actions being outward. For this reason the pressure differential with a dual type of seal such as shown in Fig. 1 need not be greatly in excess of that required for the seal shown in Fig. 3.

Several systems may be utilized in maintaining the pressure differential on opposite ends of the seal. Thus, it is possible to utilize a stand-pipe 75 communicating with the interior of the shell 10 and extending upward to a point above the level of the external liquid. By introducing additional liquid into the upper end of this stand-pipe, the level of the internal liquid therein can be made to rise above the level of the external liquid, the difference in these two levels representing the pressure head which will set up a pressure differential on opposite sides of the seal. It is entirely practical to operate the device in such a manner providing the proper head of liquid is maintained in the stand-pipe 75. This is sometimes difficult to accomplish, especially in deep installations, for if the stand-pipe 75 is maintained full of the internal liquid the pressure differential will be greatly in excess of that required, thus resulting in undue loss of the internal liquid. In some instances such a system may advantageously include a pressure relief valve 76 normally closed by a spring 77, this valve opening to allow escape of the internal liquid from the shell to relieve an excess pressure differential. With this form of the invention an amount of internal liquid in excess of that actually required may be supplied to the stand-pipe 75, the excess pressure being relieved through the pressure-relief valve 76. It is usually desirable though not always necessary to provide a check valve at some position in the stand-pipe 75, this check valve being shown at the lower end of this pipe and being indicated by the numeral 78. In the form shown a spring 79 engages a ball 80 to prevent any return flow of the internal liquid into the stand-pipe 75.

It is usually preferable, however, to automatically control the pressure differential. This necessitates the use of a pressure-responsive means 81 shown as comprising an inverted bell 82 forming a gas chamber 83 and supported in the shell 10 by a perforated wall 84. In this form of the invention the upper portion of the gas chamber 83 entraps a body of gas, while the lower end of the gas chamber is in open communication with the liquid in a chamber 85 formed in the shell 10 below the wall 84 and hereinafter termed a pressure-transfer chamber. The level of the liquid in the gas chamber 83 is indicated by the numeral 86 and it will at once be apparent that an increase in pressure in the shell will cause this level to rise compressing the gas entrapped in the upper end of this chamber, while a decrease in pressure will lower this level 86.

This gas chamber 83 has a dual function. In the first place, it provides a variable volume means compensating for the expansion of the internal liquid due to the heat generated in the motor 28. This expansion will cause the level 86 to rise, compressing the gas in the chamber 83. Subsequently, when the motor is de-energized and the internal liquid cools, the gas in the chamber 83 will expand to maintain the pressure inside the shell 10 greater than the pressure at the depth of submergence of this shell. In the second place, this chamber forms a convenient means for controlling the supply of internal liquid or gas to the shell 10 to control the pressure. To accomplish this end we position guides 88 and 89 in the gas chamber 83. The guide 88 is grounded to the shell 10 through the wall 84, this shell in turn being grounded through the external liquid in which it is submerged or by means of the stand-pipe 75. An upper contact 90 is mounted on the guide 88 near the upper end of the gas chamber, while a lower contact 91 is mounted on the lower end of this guide and positioned a distance above the lower end of the inverted bell 82 as shown. The guide 89 is insulated as by a bushing 92 and is preferably formed of an insulating material. It in turn carries upper and lower contacts 93 and 94 positioned opposite the contacts 90 and 91, these contacts 93 and 94 being thus insulated from each other. A float 95 moves upward and downward in the gas chamber in response to variations in the level 86 and carries an upper contact bar 97 and a lower contact bar 98.

Should the pressure in the shell 10 drop to such a degree that the contact bar 98 is lowered into bridging relationship with the lower contacts 91 and 94, a circuit is completed from a grounded conductor 100 of a supply line through ground and to the guide 88 and contact 91, thence through the contact bar 98, the contact 94, and a conductor 101 extending upward to the surface of the ground in a lead-covered cable 102, the current flowing through a solenoid 103 and returning to the supply line. This energizes the solenoid 103 which in turn opens a valve 104 allowing internal liquid to move from a tank 105 through the valve 104 and into the stand-pipe 75 thus increasing the pressure in the shell 10. The rate of flow to this internal liquid may be controlled by a valve 106 in the stand-pipe 75.

As additional internal liquid is supplied to the shell 10 to raise the pressure therein the level 86 rises, thus breaking the circuit between the lower contacts 91 and 94, and thus de-energizing the solenoid 103 to close the valve 104. At the instant this circuit is opened there is usually present in the stand-pipe 75 a quantity of the internal liquid which is flowing downward therethrough. This liquid will continue to enter the shell 10 until pressure equilibrium is maintained between the column of liquid in the stand-pipe 75 and the interior of the shell. This additional quantity of internal liquid will move the level 86 upward slightly so as to further separate the contact bar 98 from the contacts 91 and 94. The amount of this additional liquid entering the shell 10 will depend, of course, upon several factors including the time necessary for the liquid to move downward in the pipe 75 and upon the setting of the valve 106. If the valve 106 is opened only very slightly the time required to build up the pressure in the shell 10 will be correspondingly increased, and the additional supply of internal liquid previously mentioned will be almost completely eliminated. On the other hand, if the valve 106 is opened further, the time interval for the pressure to change in the shell 10 will be decreased and the amount of this additional supply of internal liquid will be correspondingly increased. It should be understood, however, that on shallow installations the stand-pipe 75 may be almost completely filled with the internal liquid in which case the amount of additional internal liquid which will reach the shell 10 after the valve 104 is closed will be smaller.

If through leakage, excess pressure in the shell 10, or dissolving of the gas in the internal liquid, the level 86 should rise to such an extent that the contact bar 97 bridges the upper contacts 90 and 93 a circuit will be completed from the grounded conductor 101 of the supply line, through ground to the contact 90, thence through the contact bar 97 and the contact 93 to a conductor 109 extending upward in the cable 102, the current flowing through this conductor then passing through a solenoid 110 and returning to the supply line. The energization of this solenoid may be used to supply additional gas to the chamber 83 by a system shown in Fig. 1, which may conveniently include a tank 112 containing a compressed gas and connected to a pipe 113 including a valve 114 which is operated by the solenoid 110, this valve being open when the solenoid is energized. The pipe 113 extends downward and through the shell 10 and communicates with the upper end of the gas chamber 83. If desired a check valve 116 may be positioned at the lower end of this pipe, though this check valve may be eliminated without departing from the spirit of the invention. If this check valve is utilized, only that gas in the upper portion of the gas chamber 83 will be compressed when the level 86 rises. If the check valve is not utilized, the pipe 113 in effect forms a part of the gas chamber and a rise in the level 86 will compress the body of gas therein. Additional gas delivered to the upper end of the gas chamber 83 will move the float 95 downward until the contact bar 97 breaks contact with the contacts 90 and 93, at which time the valve 114 closes. In some installations it is possible to dispense with these means for supplying additional gas to the gas chamber 83 relying upon the gas initially introduced therein to give the desired action.

It will be understood that these operations are entirely automatic, and that additional internal liquid or gas will be supplied as a function of the position of the float 95 regardless of what changes the position thereof. This change in position may be caused by expansion or contraction in the shell, by escape of the internal liquid through the seal 35, by escape of the internal liquid from other portions of the shell including the valve 76, etc.

It should not be understood that our invention is limited to the utilization of a system wherein the lower end of the gas chamber 83 communicates with the internal liquid. It is entirely possible to maintain a body of the external liquid in the lower portion of the pressure-transfer chamber 85. If the external liquid is water and the internal liquid is oil as is usually the case, the pressure-transfer chamber 85 may contain contacting bodies of the water and oil, but these bodies will be maintained in a quiescent state due to the presence of the wall 84. Such a body of the external liquid may be introduced into the pressure chamber 85 before submergence. In other instances the external liquid may be purposely or inadvertently introduced during the operation of the motor. Under such adverse conditions the lower end of the shell will contain contacting bodies of these liquids engaging each other at a surface of contact so that the internal liquid in the shell is in this instance really composed of two liquids in pressure-transferring relationship. If this surface of contact rises to a level at or above the lower end of the inverted bell 82, it will be clear that the lower end of the gas chamber 83 will communicate with the external liquid rather than the internal liquid. If, at such time, additional liquid is supplied through the pipe 75 to build up the pressure in the shell, a portion of the external liquid may be forced into the gas chamber 83 to raise the level 86 as previously described. At this time the gas chamber may contain a body of the external liquid in the lower portion thereof, a body of the internal liquid floating thereon, and a body of gas in the upper end of this chamber. Should the external liquid rise in the gas chamber 83 to such an extent that it bridges across the contacts 91 and 94, a circuit will be completed through these contacts, as previously described, and the valve 104 will be opened to supply additional internal liquid to the shell. This will cause the level 86 to rise until the contact bar 97 bridges the contacts 90 and 93 at which time the gas valve 114 will be opened and gas will be supplied to the upper portion of the chamber. If the gas pressure is greater than the pressure in the shell 10, the level 86 will be forced downward at this time and external liquid will be discharged through the valve 76. If not, the internal liquid will continue to be supplied to the pipe 75 until this pipe is completely filled or until the pressure relief valve 76 opens. When this valve opens the external liquid in the lower portion of the pressure-transfer chamber 85 will be discharged outward, and when the level of the internal liquid comes adjacent the lower end of the inverted bell 82, this internal liquid will rise in the gas chamber 83 to displace the external liquid previously therein. When this external liquid has been displaced to a level below the contacts 91 and 94, the valve 104 will automatically close. Usually, however, it is desirable for the operator to manually close the valve 106 when it becomes apparent that both the solenoids 103 and 110 are energized to open the valves 104 and 114. The operator can also manually open the valve 114 during the time that the valve 106 is closed forcing additional gas into the upper end of the chamber 83 to lower the level 86. If the pressure developed by the gas is sufficient to open the pressure relief valve 76, the external liquid will be forced downward through this valve. Ordinarily, however, there is no external liquid in the pressure-transfer chamber 85.

In Fig. 5 is disclosed an alternative form of the invention in which the gas chamber includes the lower end of the shell 10, this gas chamber being indicated by the numeral 120 and being closed at its upper end by a wall 121 extending across the shell 10. A pipe 122 is in open communication with the motor chamber and communicates with the lower end of the gas chamber 120. The lower end of the gas chamber 120 is filled with a body of the internal liquid, as is also the pipe 122 and the motor chamber. The level of the internal liquid in the gas chamber 120 is indicated by the numeral 123, that portion of the chamber thereabove being filled with gas. A float 124 is mounted on a pivot arm 125 and floats upon the surface of the internal liquid. The arm 125 carries a blade 126 which, when in a position shown in full lines, bridges between contacts 127 and 128 corresponding to the contacts 91 and 94 previously described. The bridging of these contacts may be made to supply additional internal liquid to the shell 10 as previously described. In the form shown, however, these contacts are wired in circuit with a lamp or other indicating means 130 which indicates to the operator that the level 123 is low. The operator may thus open a valve 131 to supply additional internal liquid to the upper end of a pipe 132 communicating with the lower end of the gas chamber 120 through a check valve 133. As soon as the blade 126 breaks contact with the contacts 127 and 128, this circuit is broken and the indicating means 130 indicates the position of the level 123 to the operator.

If the volume of gas in the upper end of the gas chamber 120 decreases to such an extent that the float moves into its dotted line position the blade 126 will bridge across contacts 134 and 135 corresponding to the contacts 90 and 93 previously described. A circuit similar to that shown in Fig. 1 can be utilized to automatically supply gas at this time, but in the embodiment shown this circuit is connected to a lamp 136 or other indicating means which indicates to the operator that additional gas should be supplied. This may be done through a pipe 137 including a valve 138 which when open supplies gas to the upper end of the pipe 132. This gas will force the internal liquid in the pipe into the shell, but as soon as the pipe 132 is entirely filled with gas this gas will reach the upper end of the chamber 120. The supply of gas should be discontinued as soon as the indicating means 130 indicates that the level 123 has reached the position shown, for it is usually not desirable to lower this level to a point adjacent the lower end of the pipe 122, otherwise gas would move upward to the seal thereby possibly destroying the fluid films maintained therein and causing undue wear. This system is designed so that an excess internal pressure will be maintained even when the level of the internal liquid lowers to the position indicated by the numeral 123.

One advantage of this type of structure lies in the provision of a larger gas chamber 120. So also, the currents in the control circuits are broken beneath the surface of the internal liquid, thereby preventing sparking.

In Fig. 6 we have illustrated an alternative form of the invention wherein the excess internal pressure can be developed by a small pump driven by the shaft. In this form of the invention a wall 150 extends across the upper end of a shell 151 to define an intake chamber 152 communicating with the intake of an impeller 153 rotated by the shaft. This impeller discharges into a pressure chamber 154 formed below the wall 150, and this pressure chamber is in communication through a pipe 155 with the lower end of a pressure-transfer chamber 156 formed in the lower end of the shell below a baffle 157. An intermediate wall 158 extends across the shell 151 below the motor and co-operates with the baffle 157 in defining a gas chamber 160. The lower end of this gas chamber is in communication with the motor chamber through a pipe 161 which extends downward therein. A pipe 164 extends upward above the level of the external liquid and supplies internal liquid to the shell 151. If desired, a check valve 165 may be positioned in the pipe 164 to prevent return flow of this internal liquid.

A wall 167 separates the motor chamber from the pressure chamber 154, and a suitable sealing means is positioned at the junction of the shaft and this wall. This sealing means may be of the type shown in Fig. 1 or may be in the form of a conventional stuffing box, as shown by the numeral 169. The lower end of this stuffing box communicates with the motor chamber, while the upper end thereof may communicate with a passage 170 which opens on the external liquid. Thus, if a pressure differential is built up between the motor chamber and the external liquid, this pressure differential will tend to force a small quantity of the internal liquid upward through the stuffing box 169 and through the passage 170.

Such a pressure differential is maintained in this form of the invention by the impeller 153 acting in conjunction with the gas chamber 160. If we assume for a moment that the internal and external pressures are equal when the motor is not in operation, it will be clear that when the shaft rotates the pressure in the pressure chamber 154 will be increased due to the rotation of the impeller 153. This impeller will draw external liquid into the intake chamber 152 through an inverted cup 172 surrounding a neck 173 of the shell 151. The discharge pressure of the impeller 153 will be transmitted through the pipe 155 to the lower end of the pressure-transfer chamber 156. The lower end of this chamber is filled with a body of external liquid, while the upper end thereof is filled with a body of the internal liquid, these liquids being in quiescent contact at a surface 175. This excess pressure is transmitted through openings 176 of the baffle 157, and thus forces a small quantity of the internal liquid upward into the gas chamber 160. A body of gas is entrapped in the upper end of this gas chamber above a surface 177 of the internal liquid, and this body of gas is compressed by the upward flow into the gas chamber 160. This in turn builds up the pressure in the motor chamber through the pipe 161, thus building up a pressure differential on the packing 169. When the motor is de-energized a check valve 180 may be used to prevent the gas in the gas chamber from expanding to force liquid through the pipe 155 in a return direction, thus maintaining a pressure differential on the packing 169 even though the motor is not in operation. This pressure differential will gradually decrease as leakage takes place through this stuffing box, thus allowing the gas to slowly expand. The stuffing box 169 can, however, be designed so that this leakage is small.

In some instances it is possible to dispense with a check valve 180, allowing the gas to expand and force external liquid through the pipe 155 and into the pressure chamber 154 when the motor is de-energized. This excess liquid will flow through the passage of the impeller and be discharged from the intake chamber. Such a system, however, does not maintain a pressure differential on opposite sides of the stuffing box 169 when the motor is stationary. With certain types of seal this system can be advantageously utilized in view of the fact that there is substantially no tendency to intermix the internal and external liquids in the stuffing box or other seal when the shaft is stationary. With such a system the gas will expand until the pressures on opposite sides of the stuffing box 169 are substantially equal when the motor is not operating.

It will be understood that additional internal liquid or gas may be supplied to the pipe 164 by any of the means previously described, whether this supply be manually controlled or automatically controlled by a float operated in the gas chamber 160.

In the form of the invention shown in Fig. 7, we have illustrated another form of the invention in which a different type of gas chamber is utilized. In this form we provide a shell 200 including an intermediate wall 201 through which the shaft extends. An impeller 202 is mounted on the shaft and intakes from a motor chamber 203 formed below the intermediate wall 201, this impeller discharging into a pressure chamber 204 formed in the shell 200 above this intermediate wall. A seal 205 which may be of the form shown in Fig. 1 or in the form of a conventional stuffing box or other sealing means, seals the shaft with respect to the pressure chamber 204.

In this form of the invention the gas chamber is formed by a pipe 208 communicating at its lower end with the pressure chamber 204. This pipe 208 preferably extends upward to a point above the level of the external liquid in which the structure is submerged and the upper end thereof in the preferred embodiment is open to the atmosphere. Additional internal liquid is supplied to the motor chamber through a pipe 210 which may include a check valve 211 if desired, this check valve preventing return flow. In addition, a pressure-relief valve 212 may be utilized to prevent the building up of excess pressure in the shell 200, as previously described.

For the purpose of illustrating the operation of this form of the invention, let it be assumed that the internal and external pressures on the shell 200 are substantially equal and that the surface of the external liquid is represented by the line A—A. Under such conditions it will be clear that the internal liquid will stand in the pipe 208 substantially at the level A—A. It will be further clear that except for the valve 211 the internal liquid would stand in the pipe 210 substantially at the level A—A. The presence of this check valve 211 will ordinarily permit the level in the pipe 210 to be slightly higher. If now the motor is set into operation, it will be clear that the impeller 202 will increase the pressure in the discharge chamber 204. This will set up a pressure differential on the seal 205 and will tend to draw liquid from the pipe 210 to lower the level therein. At the same time the operation of the impeller 202 will raise the level of the internal liquid in the pipe 208 to a level indicated by the line B—B. The vertical distance between the levels A—A and B—B will be dependent upon the pressure developed by the impeller 202 as well as the pressure existing inside the shell 200. The level B—B can, of course, be raised by supplying additional internal liquid to the upper end of the pipe 208 as by a device 213, or it can be raised by supplying liquid to the pipe 210 as by opening a valve 215 controlling the flow from a storage tank 216. If desired, the valve 215 may be electrically operated to open during the time that the motor is energized, this being most conveniently accomplished by the use of a solenoid 218 connected across one phase of the current-supply source so as to be energized only when the motor is energized. The energization of the solenoid 218 opens the valve 215 and allows internal liquid to slowly drip into the pipe 210. If an excess head of liquid is built up in this pipe, this excess pressure will be relieved by the pressure-relief valve 212 if used.

When the motor is de-energized the surface of the internal liquid in the pipe 208 will be at the level B—B which level is above the level A—A. A pressure head will thus be developed by the head of liquid in the pipe 208, this pressure head being in excess of the pressure at the depth of submergence of the shell due to the previous pumping action of the impeller 202. This pressure is, of course, transmitted to the interior of the shell 200 and acts to maintain the pressure differential on opposite sides of the seal 205. Any leakage taking place through this seal will tend to lower the level B—B but the pipe 208 may be of a diameter to form a gas chamber of considerable volume. If the leakage through the seal 205 is small, the level B—B will drop only very gradually, compensating for any contraction of the internal liquid due to the motor being de-energized, and compensating for any internal liquid which escapes through the seal 205. It will be clear that the check valve 211 prevents any return flow of the internal liquid into the pipe 210, and that the pressure differential on opposite sides of the seal 205 is represented by the difference in elevation between the levels A—A and B—B. As the level B—B drops, this pressure differential will decrease. It will be found in actual practice that the level B—B will never drop exactly to the level A—A, assuming that the latter level is constant, due to the fact that it invariably requires a slight differential pressure to force liquid through the seal 205. In view of the fact that the shaft is stationary at this time there will be no tendency for intermixture to take place in this seal. Even when the shaft starts to rotate such intermixture is prevented by the combination of two factors; namely, the presence of a pressure differential due to the head of liquid in the pipe 208 above the level A—A and due to the immediate building up of the pressure in the chamber 204 due to the action of the impeller 202.

In some instances it is possible to dispense with the check valve 211 providing a sufficient head of liquid is maintained in the pipe 210. When the motor of such a system is in operation the level in the pipe 210 will be controlled by two factors; namely, the amount of the internal liquid supplied to the upper end of this pipe and the intake pressure of the impeller 202. It will be understood, however, that the surface of the internal liquid in the pipe 208 may still be considerably above the level A—A. If then the motor is de-energized a portion of the internal liquid will flow from the pipe 208 into the pressure chamber 204 through the passages of the impeller 202 and will rise in the pipe 210 until the pressure head in the pipe 210 equals the pressure head at the lower end of the pipe 208. The pipe 210 is preferably made of much smaller diameter than the pipe 208 so that the quantity of liquid flowing upward in the pipe 210 will be small as compared with the quantity of liquid retained in the pipe 208.

It should not be understood, however, that the pipe 208 must extend to the surface of the ground and be open to the atmosphere. If this pipe is closed at its upper end a body of gas will be entrapped in the upper end thereof, and the level B—B will not be as high as when the upper end of the pipe is open. Regardless of whether this pipe is open it will be clear that the pipe defines a gas chamber, the upper end containing a gas and the lower end communicating with the interior of the shell 200. One of the essential differences between the form of the invention shown in Fig. 1 and that shown in Fig. 6 is in the placement of this gas chamber, though the function of this gas chamber as a means for storing variable quantities of the liquid in the shell is the same.

In the form of the invention shown in Fig. 8 we have shown a structure in which the gas chamber is positioned in the upper end of the shell 250. A seal 251 is positioned at the junction of the shaft and an upper wall of the shell, a gas chamber 253 being defined between this upper wall and an intermediate wall 252. The upper end of the gas chamber is filled with gas so that the inner end of the seal 251 is contacted by gas, this gas tending to escape outward into the external liquid due to its buoyancy and due to the fact that the pressure inside the shell 250 is maintained greater than the pressure at the depth of submergence of the shell. The lower end of the shell is filled with the internal liquid, the surface thereof being indicated by the level C—C. An impeller 255 is mounted on the shaft and intakes from the motor chamber and discharges into the gas chamber, thus maintaining a pressure differential on opposite sides of the seal 251. Additional internal liquid is supplied through a pipe 257 including a check valve 258 if desired, this liquid being supplied by any of the means previously described. In view of the fact that gas leaks through the seal 251 it is necessary to continuously or intermittently supply additional gas to the gas chamber. This may be accomplished by the use of a pipe 260. The gas may be supplied manually or automatically by means previously described. If an automatic system is desired, a float may be positioned in the gas chamber 253 to control the supply of gas or internal liquid or both, as previously described. If such a float system is utilized, it is desirable to maintain a level of the internal liquid between the levels C—C and D—D so that the inner end of the seal 251 will always be contacted by the gas.

The present invention is an improvement over those shown and claimed in our copending applications, Serial Nos. 634,908, 634,911 and 231,-513. So also our copending application Ser. No. 524,494 contains dominating subject matter relative to a control system for the submerged motor construction.

We claim as our invention:

1. In a submersible electric motor structure, the combination of: a shell containing a liquid and defining a motor chamber, said shell being submerged in an external liquid; a motor in said motor chamber; a shaft on said motor; a seal at the junction of said shaft and said shell; walls forming a gas chamber containing gas in its upper end and openly communicating at its lower end with said liquid in said shell; and means for supplying additional liquid to said liquid in said shell under pressure greater than the pressure at the depth of submergence of said shell, thereby forcing said liquid in said shell upward in said gas chamber to raise the liquid level therein until the head developed in the lower portion of said gas chamber is greater than the pressure of said external liquid at the depth of submergence of said shell and thereby maintaining in said shell a pressure greater than the pressure outside said shell, the liquid level in said gas chamber dropping as the pressure in said shell decreases.

2. In a submersible electric motor structure, the combination of: a shell containing an internal liquid and submerged in an external liquid; an electric motor in said shell; walls forming a gas chamber containing gas in its upper end and communicating at its lower end with said internal liquid in said shell; a pipe means communicating with said liquid in the interior of said shell and extending upward to a point above the surface of said external liquid; means for supplying internal liquid to the upper end of said pipe means in sufficient quantity to increase the pressure in said shell to a value above the pressure of the external liquid at the depth of submergence of said shell whereby a portion of the internal liquid is forced upward in said gas chamber; and a check valve preventing return flow of said internal liquid into said pipe means.

3. In a submersible electric motor structure, the combination of: a shell entrapping a body of liquid, said shell being submerged in an external liquid; a motor in said shell; a shaft on said motor; a seal at the junction of said shaft and said shell; walls forming a gas chamber inside said shell entrapping a body of gas in its upper end and containing a body of said liquid in said shell in its lower end and communicating at its lower end with said liquid in said shell and means for supplying additional liquid to said shell under pressure greater than the pressure at the depth of submergence of said shell, thereby forcing said liquid level upward in said gas chamber to compress said gas therein, said gas expanding upon decrease in the pressure in said shell.

4. In a submersible electric motor structure, the combination of: a shell containing an internal liquid and defining a motor chamber; a motor in said motor chamber; walls defining a gas chamber communicating at its lower end with said internal liquid and containing a gas in its upper end; and pressure means for building up a pressure on said internal liquid which pressure is greater than the pressure exterior of said shell, said pressure forcing a portion of said internal liquid upward in said gas chamber to such a height that the excess pressure is balanced, the amount of said internal liquid in said gas chamber decreasing as leakage takes place from said shell.

5. In a submersible electric motor structure, the combination of: a shell containing an internal liquid and defining a motor chamber; a motor in said motor chamber; walls defining a gas chamber communicating at its lower end with said internal liquid; pressure means for building up a pressure on said internal liquid which pressure is greater than the pressure exterior of said shell, said pressure forcing a portion of said internal liquid upward in said gas chamber to such a height that the excess pressure is balanced, the amount of said internal liquid in said gas chamber decreasing as leakage takes place from said shell; and means operative in response to changes in the amount of said internal liquid in said gas chamber to control said pressure means.

6. A combination as defined in claim 4 in which said pressure means includes a means for supplying additional internal liquid to said shell and a means for supplying gas to said gas chamber, and including means operative in response to changes in the amount of said internal liquid in said gas chamber to control both said means for supplying additional internal liquid to said shell and said means for supplying gas to said gas chamber.

7. A combination as defined in claim 4 in which said last-named means includes a float in said gas chamber and floating on the surface of said internal liquid therein.

8. In a submersible electric motor structure, the combination of: a shell defining a motor chamber and entrapping a body of an internal liquid; an electric motor in said motor chamber and heating said internal liquid when in operation, thereby causing said internal liquid to expand, said motor including a rotor and a stator defining a gap therebetween which communicates with said internal liquid; and walls defining a gas chamber entrapping a body of gas in its upper end and directly communicating at its lower end with said internal liquid, whereby said internal liquid may rise in said gas chamber to compensate for said expansion of said internal liquid and to increase the pressure on the inside of said shell relative to the pressure outside thereof.

9. In a submersible electric motor structure, the combination of: a rigid-walled shell defining a motor chamber substantially filled with an internal liquid; an electric motor in said motor chamber and heating said internal liquid when in operation, thereby causing said internal liquid to expand, said shell being submerged in an external liquid said motor including a rotor and a stator defining a gap therebetween which communicates with said internal liquid; and means for compensating for said expansion, said means comprising walls forming a chamber sealed from the external liquid and communicating with the interior of said shell and into which is moved all of the excess internal liquid due to said expansion to increase the pressure in said shell, said pressure being above the pressure at the depth of submergence of said shell, said chamber containing a gas in the upper end thereof.

10. In a submersible structure, the combination of: walls defining a chamber; a shaft extending from said chamber; a semi-effective seal at the junction of said shaft and said walls and permitting a flow therethrough when a pressure differential exists on opposite ends of said seal; a pipe communicating with said chamber; means for supplying fluid to said chamber through said pipe to increase the internal pressure acting on said seal to a pressure greater than the pressure acting on the outside of said seal; a check valve in said pipe to prevent return flow of said fluid into said pipe; means communicating with said internal liquid in said chamber to receive a portion of said internal liquid; and pressure-relief means communicating with the interior of said shell and opening upon the building up of an excess pressure in said shell to relieve this pressure.

11. In a submersible electric motor structure, the combination of: a shell submerged in an external liquid and defining a motor chamber; an electric motor in said motor chamber; a shaft driven by said electric motor and extending from said motor chamber; a shoulder rotating with said shaft and providing a sealing surface; a sealing ring providing a sealing surface engaging said sealing surface of said shoulder to define a sealing means; means for movably mounting said sealing ring; and means for maintaining a pressure inside said motor chamber greater than the pressure of the external liquid communicating with the outer portion of said sealing means whereby any leakage through said sealing means will be outward rather than inward.

12. In a submersible structure, the combination of: a shell providing a chamber containing an internal liquid and submerged in an external liquid; a pipe communicating with said shell to supply internal liquid thereto; walls forming a gas chamber comprising an auxiliary pipe extending upward from said shell, the lower end of said pipe communicating with said internal liquid and the upper end containing a body of gas whereby internal liquid may rise therein under the influence of the pressure developed in said shell by the supply of internal liquid through said first-named pipe to increase the static head therein until pressure equilibrium is established; a rotatable shaft extending from said shell; a motor in said shell driving said shaft; and sealing means at the junction of said shaft and said shell.

13. In a submersible structure, the combination of: a shell providing a chamber containing an internal liquid and submerged in an external liquid; a pipe communicating with said shell to supply internal liquid thereto; walls forming a gas chamber comprising an auxiliary pipe extending upward from said shell; walls forming a pressure chamber communicating with the lower end of said auxiliary pipe; a rotatable shaft extending into said pressure chamber; and pump means operated by said shaft and raising the pressure in said pressure chamber and forcing internal liquid upward in said auxiliary pipe until the pressure in the lower end of said auxiliary pipe substantially equals the discharge pressure of said pump means.

14. In a submersible structure, the combination of: a shell providing a chamber containing an internal liquid, said shell being submerged in an external liquid; a rotatable shaft extending into said shell; a seal at the junction of said shaft and said shell and sealing said chamber from said external liquid; and a pump means operatively connected to said shaft, the discharge of said pump means remaining in open communication with said chamber during the operation of said pump means to increase the pressure in said chamber to a value above the pressure of the external liquid at the depth of submergence, whereby a pressure differential is maintained on opposite ends of said seal.

15. In a submersible structure, the combination of: a shell providing a chamber containing an internal liquid, said shell being submerged in an external liquid; a rotatable shaft extending into said shell; a seal at the junction of said shaft and said shell and sealing said chamber from said external liquid; a pump means operatively connected to said shaft to increase the pressure in said chamber to a value above the pressure of the external liquid at the depth of submergence, whereby a pressure differential is maintained on opposite ends of said seal; and walls forming a gas chamber containing a gas in its upper end and communicating at its lower end with said internal liquid and retaining a body of said internal liquid whereby the operation of said pump means changes the amount of said internal liquid in said gas chamber.

16. A combination as defined in claim 15 in which said walls forming said gas chamber include a pipe communicating with said internal liquid and extending upward from said shell.

17. A combination as defined in claim 15 in which said walls forming said gas chamber include a pipe communicating with said internal liquid and extending upward from said shell, and including a supply pipe communicating with the interior of said shell to supply additional internal liquid thereto.

18. A combination as defined in claim 3 in which said gas chamber includes a pipe communicating with said motor chamber and extending downward in said gas chamber to a position below the surface of said internal liquid in said gas chamber, said pipe throwing said lower end of said gas chamber into communication with the internal liquid in said motor chamber.

19. In a submersible structure adapted to be submerged in an external liquid, the combination of: a shell, a rotatable shaft extending from said shell; a mechanical-type seal at the junction of said shaft and said shell and including sealing surfaces between which relative movement takes place, the minute space between said sealing surfaces carrying a film of said internal liquid; means responsive to the pressure existing in said shell for moving said sealing surfaces into closer relationship when the pressure in said shell is increased; and means for maintaining a pressure inside said shell greater than the pressure of said external liquid at the depth of submergence of said shell whereby a pressure differential exists on opposite sides of said seal to maintain said film and permit a small outward flow of said internal liquid through said seal if the pressure differential is sufficiently large.

20. In a submersible electric motor structure, the combination of: walls defining a gas chamber and containing gas in its upper end and a body of internal liquid in its lower end; walls positioned beneath the surface of an external liquid and defining a motor chamber containing a body of said internal liquid and communicating with the lower end of said gas chamber, said last-named walls forming a motor chamber completely closed except for said communication with said gas chamber; a motor in said motor chamber and heating said internal liquid when energized to cause expansion thereof, the closed walls defining said motor chamber thus forcing all of the excess internal liquid into said gas chamber to raise the level of said internal liquid therein and to thus increase the pressure in said shell, said pressure being above the pressure at the depth of submergence of said shell; and a seal at the junction of said shaft and said walls of said motor chamber.

21. In a submersible electric motor structure, the combination of: walls defining a gas chamber and containing gas in its upper end and a body of internal liquid in its lower end; walls positioned beneath the surface of an external liquid and defining a motor chamber containing a body of said internal liquid and communicating with the lower end of said gas chamber, said last-named walls forming a motor chamber completely closed except for said communication with said gas chamber; a motor in said motor chamber and heating said internal liquid when energized to cause expansion thereof, the closed walls defining said motor chamber thus forcing the excess internal liquid into said gas chamber to raise the level of said internal liquid therein; a seal at the junction of said shaft and said walls of said motor chamber; and means for delivering additional internal liquid to said gas chamber from a position above the external liquid in which said structure is submerged to raise said level of said internal liquid in said gas chamber.

22. In a submersible electric motor structure, the combination of: a rigid-walled shell defining a motor chamber and containing a body of internal liquid and positioned below the surface of an external liquid; a shaft extending from said shell; a semi-effective seal at the junction of said shaft and said shell to permit a continuous flow of a minute amount of said internal liquid therethrough when a pressure differential exists on opposite sides of said seal; a pipe extending upward from said shell and communicating with the interior of said shell and containing gas in its upper end and internal liquid in its lower end whereby internal liquid in said shell may flow both into and from said pipe, said pipe containing sufficient internal liquid to develop a pressure in said shell greater than the pressure of said external liquid at the depth of submergence of said shell; and an electric motor in said motor chamber and heating said internal liquid in said shell when operating, thereby forcing the excess liquid into said pipe to raise the level of said internal liquid therein, said pipe with internal liquid therein forming a storage and returning neutral liquid to said shell when said motor is shut down and said internal liquid in said shell contracts, thus maintaining a pressure differential on said seal at all times.

23. In a submersible electric motor structure, the combination of: a shell defining a motor chamber and containing a body of internal liquid and positioned below the surface of an external liquid; a shaft extending from said shell; a semi-effective seal at the junction of said shaft and said shell to permit a continuous flow of a minute amount of said internal liquid therethrough when a pressure differential exists on opposite sides of said seal; a pipe communicating with the interior of said shell and containing gas in its upper end and internal liquid in its lower end whereby internal liquid in said shell may flow both into and from said pipe, said pipe containing sufficient internal liquid to develop a pressure in said shell greater than the pressure of said external liquid at the depth of submergence of said shell; an electric motor in said motor chamber and heating said internal liquid in said shell when operating, thereby forcing the excess liquid into said pipe to raise the level of said internal liquid therein, said pipe with the internal liquid therein forming a storage and returning internal liquid to said shell when said motor is shut down and said internal liquid in said shell contracts, thus maintaining a pressure differential on said seal at all times; and means for supplying additional internal liquid to said submersible structure to raise the level of said internal liquid in said pipe.

24. A combination as defined in claim 23 in which said pipe extends upward to a point above the surface of said external liquid, and in which said means for supplying additional internal liquid comprises means delivering internal liquid to the upper end of said pipe.

25. In a submersible electric motor structure, the combination of: a shell defining a motor chamber and containing a body of internal liquid and positioned below the surface of an external liquid; a shaft extending from said shell; a semi-effective seal at the junction of said shaft and said shell to permit a continuous flow of a minute amount of said internal liquid therethrough when a pressure differential exists on opposite sides of said seal; a pipe communicating with said chamber and containing gas in its upper end and internal liquid in its lower end whereby internal liquid in said shell may flow both into and from said pipe, said pipe containing sufficient internal liquid to develop a pressure in said shell greater than the pressure of said external liquid at the depth of submergence of said shell; an electric motor in said motor chamber and heating said internal liquid in said shell when operating, thereby forcing the excess liquid into said pipe to raise the level of said internal liquid therein, said pipe with the internal liquid therein forming a storage and returning liquid to said shell when said motor is shut down and said internal liquid in said shell contracts, thus maintaining a pressure differential on said seal at all times; means for supplying additional internal liquid to said submersible structure to raise the level of said internal liquid in said pipe; and pressure-relief means communicating between said internal and external liquids to relieve any pressure differential therebetween which exceeds a given value.

26. In a submersible electric motor structure adapted to be submerged in an external liquid, the combination of: walls defining a motor chamber containing an internal liquid; a motor in said motor chamber; a shaft associated with said motor and extending from said motor chamber; seal means at the junction of said shaft and said walls; walls defining a gas chamber communicating at its lower end with said internal liquid in said motor chamber, the upper end of said gas chamber containing a gas, said motor heating and expanding said internal liquid to cause it to rise in said gas chamber; means in said gas chamber and responsive to the level of said internal liquid in said gas chamber; an electric circuit associated with said last-named means and extending to a point above the surface of said external liquid in which said structure is submerged; and current-responsive means associated with said electric circuit and energized in response to the level of said internal liquid in said gas chamber.

27. In a submersible electric motor structure adapted to be submerged in an external liquid, the combination of: walls defining a motor chamber substantially filled with an internal liquid; a motor including a rotor and a stator in said motor chamber; a shaft associated with said motor and extending from said motor chamber; a semi-effective seal means at the junction of said shaft and said walls; walls defining a gas chamber openly communicating at its lower end with said internal liquid in said motor chamber, the upper end of said gas chamber containing a gas, said motor heating and expanding said internal liquid to cause all of the excess internal liquid to rise in said gas chamber; and means for supplying additional internal liquid to said gas chamber whence it may flow to said motor chamber to compensate for any deficiency of internal liquid therein.

28. In a submersible structure, the combination of: a shell providing a chamber containing an internal liquid, said shell being submerged in an external liquid; a rotatable shaft extending into said shell; a motor in said chamber driving said shaft; a seal at the junction of said shaft and said shell; a pump means operatively connected to said shaft and delivering a pressure in excess of the pressure of said external liquid at the depth of submergence of said shell; walls defining a gas chamber containing a body of internal liquid in its lower end and a body of gas in its upper end, said gas chamber openly communicating with said chamber in said shell; and passage means communicating between the discharge of said pump means and said internal liquid in the lower end of said gas chamber whereby the pressure built up by said pump is transmitted to said gas chamber and tends to raise the level of said body of internal liquid therein.

29. A combination as defined in claim 28 including a check valve in said passage means and preventing a return flow to said pump means.

30. In a submersible structure adapted to be submerged in an external liquid, the combination of: walls defining a chamber containing an internal liquid; a motor in said chamber; a shaft associated with said motor and extending from said chamber through one of said walls; a semi-effective seal at the junction of said shaft and said one of said walls; expansion-compensating means communicating with said chamber and providing a space into which a portion of said internal liquid may flow from said chamber when said internal liquid is heated by the operation of said motor; a pipe communicating with said internal liquid; means for supplying internal liquid to said pipe in sufficient quantity to maintain the pressure in said chamber greater than the pressure of said external liquid at the depth of submergence of said walls whereby a pressure differential is built up on said seal; and a check valve preventing return flow of said internal liquid from said first-named chamber into said pipe.

31. In a submersible structure adapted to be submerged in an external liquid, the combination of: walls defining a chamber containing an internal liquid; a motor in said chamber; a shaft associated with said motor and extending from said chamber through one of said walls; a semi-effective seal at the junction of said shaft and said one of said walls; expansion-compensation means communicating with said chamber and providing a space into which a portion of said internal liquid may flow from said chamber when said internal liquid is heated by the operation of said motor; a pipe communicating with said internal liquid; and means for supplying internal liquid to said pipe in sufficient quantity to maintain the pressure in said chamber greater than the pressure of said external liquid at the depth of submergence of said walls whereby a pressure differential is built up on said seal, said last-named means including a storage means for said internal liquid and positioned above the surface of said external liquid in which said structure is submerged and including a valve controlling the flow of said internal liquid from said storage means to said pipe.

32. In a submersible structure adapted to be submerged in an external liquid, the combination of: a shell defining a motor chamber and containing an internal liquid; an electric motor in said motor chamber and heating said internal liquid when in operation, thereby causing said internal liquid to expand; and means for compensating for said expansion and including walls forming a chamber inside said shell and containing a compressible medium, said walls forming said chamber being within said body of internal liquid so as to be surrounded thereby to transmit changes of pressure of said internal liquid to said compressible medium in said chamber.

33. In a submersible structure adapted to be submerged in an external liquid, the combination of: a shell containing an internal liquid; a motor in said shell; a shaft associated with said motor and extending upward from said shell; sealing means positioned at the junction of said shaft and said shell whereby said sealing means is positioned at the upper end of said shell; and walls defining a gas chamber positioned below said seal and communicating at its lower end with said internal liquid, the upper end of said gas chamber containing a body of gas, any gas escaping from said gas chamber thus rising in said internal liquid to the uppermost part of said shell to a position adjacent said seal.

34. A combination as defined in claim 4 in which said pressure means includes walls forming a pressure chamber, and a pumping means in said pressure chamber and driven by said motor, the discharge pressure of said pumping means being delivered to said motor chamber and being greater than said pressure exterior of said shell.

EARL MENDENHALL.
JUNIUS B. VAN HORN.

CERTIFICATE OF CORRECTION.

Patent No. 2,002,913. May 28, 1935.

EARL MENDENHALL, ET AL.

It is hereby certified that error appears in the printed specification of the above numbered patent requiring correction as follows: Page 10, first column, line 11, claim 22, for "neutral" read internal; and line 74, claim 25, after "returning" insert the word internal; and that the said Letters Patent should be read with these corrections therein that the same may conform to the record of the case in the Patent Office.

Signed and sealed this 16th day of July, A. D. 1935.

Leslie Frazer (Seal) Acting Commissioner of Patents.